United States Patent [19]

de Winter

[11] 3,936,975

[45] Feb. 10, 1976

[54] BED FOR GROWING MUSHROOMS AND THE LIKE

[75] Inventor: Jan Gerrit de Winter, Enschede, Netherlands

[73] Assignee: Nicolon B.V., Enschede, Netherlands

[22] Filed: June 27, 1974

[21] Appl. No.: 483,542

[52] U.S. Cl. ............................ 47/1.1; 47/56
[51] Int. Cl.² ............................ A01G 1/04
[58] Field of Search ............ 47/1.1, 56, 1.2

[56] References Cited
UNITED STATES PATENTS

| | | | |
|---|---|---|---|
| 2,876,588 | 3/1959 | Tietz et al. | 47/56 X |
| 2,923,093 | 2/1960 | Allen | 47/56 |
| 2,971,290 | 2/1961 | Kyle | 47/56 UX |
| 3,315,408 | 4/1967 | Fischer | 47/56 X |
| 3,832,802 | 9/1974 | Huys et al. | 47/1.1 |

*Primary Examiner*—Stephen C. Pellegrino
*Attorney, Agent, or Firm*—Strauch, Nolan, Neale, Nies & Kurz

[57] ABSTRACT

An elongated bed for growing mushrooms and the like is longitudinally displaceable by being supported on an open-weave fabric slidable on a second open-weave fabric which in turn is supported on a floor.

9 Claims, 2 Drawing Figures

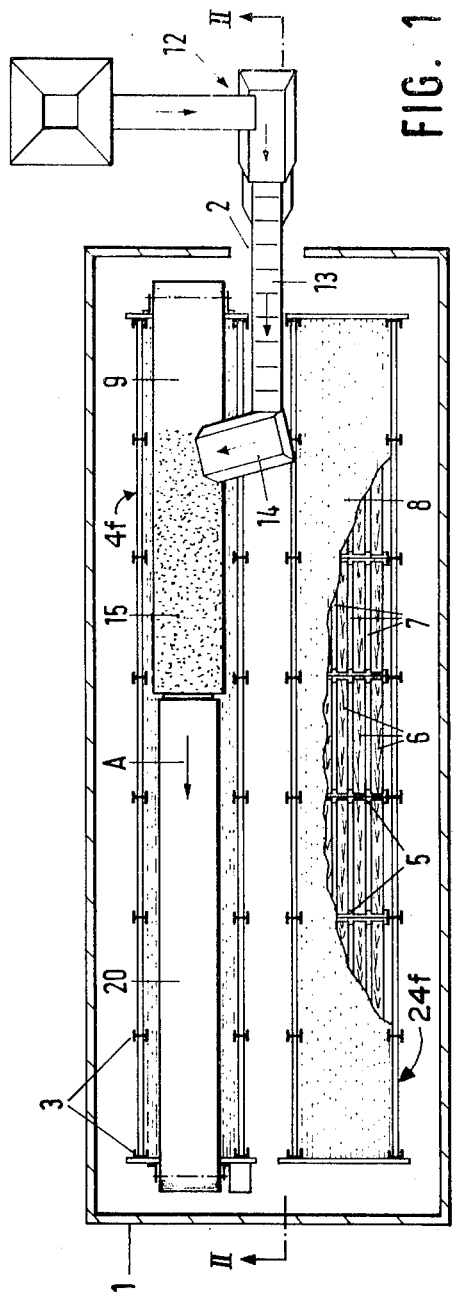
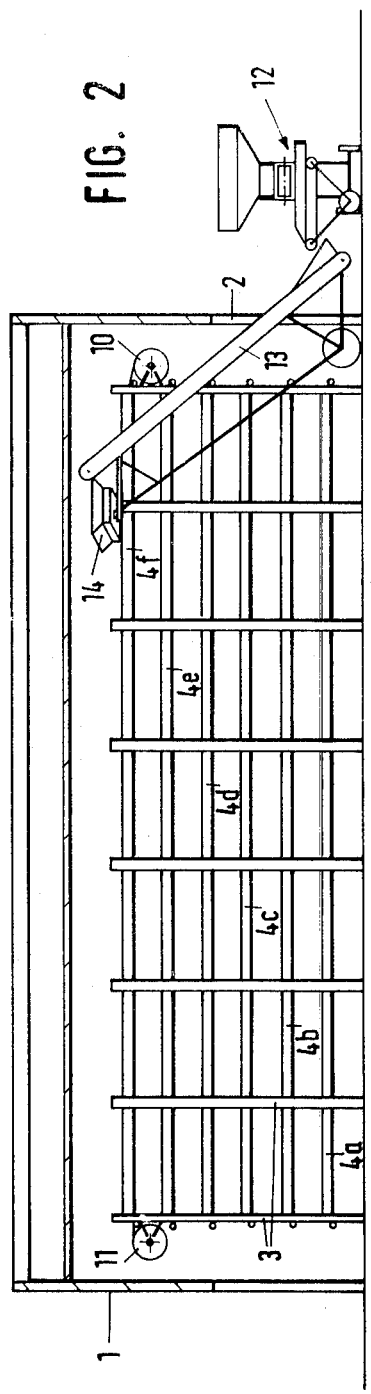

BED FOR GROWING MUSHROOMS AND THE LIKE

This invention relates generally to the cultivation of mushrooms and like crops, and in particular to a bed for growing such crops.

Although the invention will be described hereinafter with particular reference to the cultivation of mushrooms, it is to be understood that it is not so limited, and can also be utilized for the cultivation of other crops grown under similar conditions.

Mushrooms are at present being grown in air-conditioned spaces in beds of about 10 to 30 centimeters of a growing medium, such as compost earth, supported on a supporting floor. In a typical example of such an arrangement, there would be tiers of five to seven of such beds in superposed relationship, each bed being about 1.4 m wide and about 15 m long, with the interspace between superposed beds being 30 to 40 cm, and the lanes between adjacent tiers being no more than about 1 m. In such an arrangement it is essential that after completion of the cultivation the growing medium, in particular the old, spent compost earth, is removed and after disinfection of the cell replaced with fresh growing medium.

For obvious reasons of economy, room for attendant personnel is limited, and hence the introduction, and in particular the replacement of the layer of growing medium is a time-consuming and cumbersome operation.

It is an object of the present invention to provide a cultivation bed enabling ready and relatively rapid introduction of the layer of growing medium, and in particular ready and rapid replacement thereof, with optimum support characteristics, in particular as regards the aeration of the layer of growing medium from the bottom upwards.

According to the present invention, there is provided an elongated bed for the cultivation of mushrooms or like crops, comprising a layer of growing medium, such as compost earth, supported on two superimposed webs of woven fabrics carried by a supporting floor, said fabrics being both highly permeable to air and consisting of a material inert to biochemical influences and resistant to temperatures of up to at least 70°C, the upper one of said two webs of fabric being substantially impermeable to the growing medium of said layer, and the top surface of the lower one of said two webs of fabric being smoother than the bottom surface thereof, so that during relative displacement in the longitudinal direction of the bed the frictional resistance of the lower web relative to said supporting floor is considerably greater than relative to said upper web, the fabric of said lower web being of considerably more open weave than the fabric of said upper web. By virtue of this arrangement, in which the layer of growing medium lies on two webs of fabric, the lower one of which has a relatively smooth upper face, a layer of medium can be deposited on the upper web of fabric at one end of the bed and moved inwards lengthwise of the bed, supported on the upper one of the webs of fabric, sliding on the lower web of fabric. When the layer of growing medium needs replacement, it can be slid out in the same way and removed at the end of the bed. Thus the introduction and removal of growing medium can be effected efficiently and the relatively low height between superposed beds is no longer an impediment.

In a preferred embodiment of the cultivation bed according to the invention the weave of the lower web of fabric is such that one surface of the web, namely, that which, in use, is the upper surface thereof, is predominantly constituted by warp threads. When relatively smooth threads are used for making the web, in particular monofilaments of plastics materials, the top surface of the lower web of fabric thus acquires relatively low-friction characteristics, which facilitates the sliding of the upper web over it, whereas the relatively high-friction bottom surface of the lower web of fabric retains its hold on the supporting floor.

Further features and details of the invention, especially as regards the preferred weave, materials and meshes to be used for the fabrics, as well as the way in which the two webs can be brought into their operative position and removed, will become apparent from the following description of a preferred embodiment of a mushroom cultivation cell with reference to the accompanying diagrammatic drawings.

In said drawings,

FIG. 1 is a horizontal section, partly in plan view, of two cultivation beds, located side by side in a mushroom cultivation cell, with some parts being broken away and with the beds in different situations;

FIG. 2 is a part-sectional elevation on the lines II—II of FIG. 1.

Referring to the drawings, the outer wall of a mushroom nursery cell is designated by reference numeral 1. The cell has a doorway 2.

Reference numeral 3 designates scaffolding consisting essentially of stiles and carrying, in the embodiment shown, six cultivation beds 4a–4f supported on cross-members 5 extending horizontally between the stiles of scaffolding 3.

The support of each bed 4a–4f consists of a supporting floor formed of wooden boards 6 which rest on horizontal flanges of cross-members 5, which in vertical section are approximately of inverted "T" shape.

Boards 6 are disposed with considerable interspaces 7 (FIG. 1), so that the layer of growing medium to be carried by the supporting floor is properly aerated from below.

A lower web of fabric 8, hereinafter termed "sliding mat" lies on the supporting floor of each bed, formed by cross-members 5 and boards 6.

In the present practical embodiment, the sliding mat 8 consists of a woven fabric, inert to biochemical effects and resistant to temperatures of up to about 70°C, of polyolefinic warp and weft monofilaments. The mesh size is approximately 300 $\mu$, measured in the perpendicular projection of the fabric on the plane defined by the web, in the present case a horizontal plane.

The sliding mat has a conventional 3/1 warp cross twill weave, in which each warp thread, extending in the longitudinal direction of the web, underlies one weft thread, then overlies three adjacent weft threads, then again unerlies one weft thread, and so on, as viewed in the plan view of FIG. 1. As a result the top surface of the sliding mat is predominantly constituted by warp threads, and accordingly is relatively smooth in its longitudinal direction.

Sliding mat 8 is partly broken away in the lower half of FIG. 1 to show the subjacent supporting floor with boards 6 and cross-members 5.

Shown in the upper half of FIG. 1 is the upper or top web of fabric 9, hereinafter referred to as the "cultivation mat", of bed 4f. In the other bed 24f shown in the lower half of FIG. 1 this web has been omitted.

In the showing of FIG. 1, the cultivation mat 9 is being drawn inwards, in the direction of arrow A, from a roller 10 on which the mat is still partly wound. Roller 10 is mounted on the outside of the right-hand end of bed 4f (as viewed in FIG. 1), and mat 9 is run off the top of roller 10 drawn by a leader belt 20, which is attached to it, end-to-end, via a rod inserted in a seam at the end of mat 9. Leader belt 20 is wound upon a roller 11 at the distal end of the bed. As mat 9 is drawn in the direction of arrow A, a supply conveyor, generally designated 12, supplies material for a layer of growing medium, such as compost earth, at the right-hand end (as viewed in FIG. 1) of the bed, so that a uniform layer, about 20 cm thick, is deposited on the cultivation mat.

As shown diagrammatically in FIG. 2, conveyor 12 is portable, so that it can be used for other cells as well. It has a section 13, which transports the material diagonally upwardly, and a delivery section 14, which is pivoted over the bed to be filled and is inclined slightly downwardly. When conveyor 12 is removed from the cell, section 14 is pivoted back into substantial alignment with section 13, and the latter is subsequently lowered for it to pass through doorway 2.

It will be clear that when leader belt is wound upon roller 11 at a uniform speed, so that mat 9 is drawn inwards at a uniform rate as well, the layer of growing medium 15 can be applied in the desired uniform thickness, in the present case about 20 cm.

Owing to the particular construction of sliding mat 8, as described hereinbefore, cultivation mat 9 carrying the layer of growing medium 15 slides easily over the top surface of mat 8.

Owing to the relatively high-friction bottom surface of mat 8, the latter does not slide on boards 6 during this operation. For greater security, mat 8 is additionally anchored to scaffolding 3 in a manner not shown in the drawings.

Cultivation mat 9 has warp and weft threads of polyolefinic monofilaments, for example, of polyethylene or polypropylene, preferably of round cross-section. The mesh size of mat 9 is 135–150 $\mu$, measured in the same way as described with reference to mat 8. Warp monofilaments of about 23 dr/cm impart amply sufficient strength to the cultivation mat with a bed length of, for example, 15 m.

Owing to the use of a sliding mat under the cultivation mat, the latter has a long service life, that is to say, the layer of growing medium can be replaced many times by sliding the cultivation mat back and forth over the sliding mat, before the cultivation mat needs replacement.

If desired, roller 11 with leader belt 20 wound upon it, and including the drive therefor, which is not shown in the drawings, can be removable, so that it can be used for other beds. The same applies to roller 10 and the drive therefor. It will be understood that, in those cases, mat 8 is detached from belt 20 and from roller 10, respectively.

The use of the sliding mat ensures the uniform introduction of the layer of growing medium without jolting movements and without undesirable compacting of the material, so that proper aeration, partly promoted by the air-permeability of mats 8 and 9, is ensured.

Another advantage of the mats according to the invention is that they can easily be cleaned.

It will be understood that monofilaments of materials other than those specifically mentioned hereinbefore are likewise suitable for making the mats according to the invention, provided the material is sufficiently smooth.

We also wish it to be understood that the invention is not limited to the specific, exemplary embodiment described and shown in the accompanying drawings. Numerous variations and modifications will readily occur to those skilled in the art without departing from the scope of the invention as defined in and by the appended claims.

I claim:

1. A cultivation bed for growing mushrooms and other crops, comprising: an air permeable, supporting floor; a first, permeable, lower web of a woven fabric supported on said floor; a second, permeable, superimposed, upper web of a woven fabric supported by said lower web; and a layer of growing medium supported by said upper web, there being means comprising the weaves of the fabrics from which said upper and lower webs are fabricated for making said upper web readily slidable relative to said lower web and thereby facilitating the application of growing medium to said second web and the removal of the growing medium therefrom, said webs being biochemically inert with respect to the growing medium and the crops grown therein and resistant to temperatures at least as high as 70°C., the upper of said two webs being substantially impermeable to the growing medium thereon, the top surface of the lower of said two webs being smoother than the bottom surface thereof so that, during relative displacement of the upper web relative to the lower web, the friction between the lower web and the supporting floor will be greater than the friction between the lower and upper webs, and the fabric of said lower web being of a more open weave than the fabric of said upper web.

2. A cultivation bed as defined in claim 1, wherein the upper surface of the lower web is defined predominantly by threads extending in the direction in which the upper and lower webs are relatively slidable.

3. A cultivation bed as claimed in claim 1, wherein said lower web of fabric has a weave such that, as viewed from the top of the web, each warp thread alternately passes under one weft thread and over three weft threads, thus forming a warp cross twill weave.

4. A cultivation bed for growing mushrooms and other crops, comprising: an air permeable, supporting floor; a first, permeable, lower web of a woven fabric supported on said floor; a second, permeable, superimposed, upper web of a woven fabric supported by said lower web and slidable relative thereto; a layer of growing medium supported by said second web; and means for displacing said second web relative to said first web to facilitate the application of growing medium to said second web and the removal of growing medium therefrom, said webs being biochemically inert and resistant to temperatures at least as high as 70°C., the fabrics of both webs consisting of polyolefinic monofilaments, the fabric of said upper web having a mesh size of 135–150 microns and the fabric of said lower web having a mesh size of about 300 microns, both measured in the perpendicular projection of the fabric on the plane defined by the web, whereby said upper web is substantially impermeable to the growing medium thereon and the fabric of said lower web is more open than the fabric of said upper web, and the top surface of the lower web being smoother than the bottom surface thereof so that, during relative displacement of the upper web relative to the lower web, the friction between the lower web and the supporting floor will be greater than the friction between the lower and upper webs.

5. A cultivation bed for growing mushrooms and other crops, comprising: an air permeable, supporting floor; a first, permeable, lower web of a woven fabric supported on said floor; a second, permeable, superimposed, upper web of a woven fabric supported by said lower web; and a layer of growing medium supported by said upper web, there being means comprising the weaves of the fabrics from which said upper and lower webs are fabricated for making said upper web readily slidable relative to said lower web and thereby facilitating the application of growing medium to said second web and the removal of growing medium therefrom by making it possible to slide said upper web to one end of said bed and there remove and replace the growing medium, the lower web being woven of polyolefinic monofilaments in a warp, cross twill weave in a mesh size of about 300 microns and being disposed with its upper surface predominantly constituted by longitudinally extending warp threads and the upper web eing woven of polyolefinic monofilaments in a weave having a mesh size of about 135 to 150 microns, whereby the friction between said lower web and said supporting floor is greater than the friction between said lower web and said upper web and the upper web with the layer of growing material thereon can therefore be slid longitudinally over said lower web without substantially displacing said lower web relative to said supporting floor.

6. The cultivation as claimed in claim 5, wherein said webs are woven of polyethylene monofilaments of round cross-section.

7. The cultivation as claimed in claim 5, wherein said webs are woven of polypropylene monofilaments of round cross-section.

8. A cultivation bed for growing mushrooms and other crops, comprising: an air permeable, supporting floor; a first, permeable, lower web of a woven fabric supported on said floor; a second, permeable, superimposed, upper web of a woven fabric supported by said lower web; and a layer of growing medium supported by said upper web, there being means comprising the weaves of the fabrics from which said upper and lower webs are fabricated for making said upper web readily slidable relative to said lower web and thereby facilitating the application of growing medium to said second web and the removal of growing medium therefrom by making it possible to slide said upper web to one end of said bed and there remove and replace the growing medium, the lower web being woven of polyolefinic monofilaments in a warp, cross twill weave in a mesh size of about 300 microns and being disposed with its upper surface predominantly constituted by longitudinally extending warp threads and the upper web being woven of polyolefinic monofilaments in a weave having a mesh size of about 135 to 150 microns, whereby the friction between said lower web and said supporting floor is greater than the friction between said lower web and said upper web and the latter with the layer of growing material thereon can therefore be slid longitudinally over said lower web without substantially displacing said lower web relative to said supporting floor; and said bed further including means for displacing said upper web relative to said lower web which comprises rotatable members at opposite ends of the bed, the ends of said upper web being attached to said rollers.

9. The cultivation bed as defined in claim 8, together with means for depositing growing medium on said upper web at said one end of said bed.

* * * * *

UNITED STATES PATENT OFFICE
CERTIFICATE OF CORRECTION

PATENT NO. : 3,936,975
DATED : February 10, 1976
INVENTOR(S) : Jan Gerrit de Winter It is certified that error appears in the above-identified patent and that said Letters Patent are hereby corrected as shown below:

Column 5, claim 5, line 25, change "eing" to --being--.

Column 5, claim 6, line 35, after "cultivation" insert --bed--.

Column 6, claim 7, line 1, after "cultivation" insert --bed--.

Signed and Sealed this eleventh Day of May 1976

[SEAL]

Attest:

RUTH C. MASON
Attesting Officer

C. MARSHALL DANN
Commissioner of Patents and Trademarks